United States Patent [19]

Braun

[11] Patent Number: 4,596,324
[45] Date of Patent: Jun. 24, 1986

[54] CLUTCH PLATE

[75] Inventor: Helmut Braun, Sinzheim, Fed. Rep. of Germany

[73] Assignee: Luk Lamellen und Kupplungsbau GmbH, Bühl, Fed. Rep. of Germany

[21] Appl. No.: 543,382

[22] Filed: Oct. 19, 1983

[30] Foreign Application Priority Data

Nov. 20, 1982 [DE] Fed. Rep. of Germany ....... 3242933

[51] Int. Cl.⁴ ............................................. F16D 13/68
[52] U.S. Cl. ............................ 192/106.2; 192/70.17; 464/64; 464/68
[58] Field of Search ............... 192/70.17, 106.1, 106.2; 464/64, 68

[56] References Cited

U.S. PATENT DOCUMENTS

| | | | |
|---|---|---|---|
| 3,414,101 | 12/1968 | Binder et al. | 192/106.2 |
| 3,534,841 | 10/1970 | Schneider et al. | 192/106.2 |
| 4,177,888 | 12/1979 | Arrowsmith | 192/106.2 |
| 4,301,907 | 11/1981 | Carpenter et al. | 192/106.2 |
| 4,433,771 | 2/1984 | Caray | 192/106.2 |
| 4,471,863 | 9/1984 | Lech, Jr. | 192/106.2 |
| 4,485,908 | 12/1984 | Gatewood | 192/106.2 |

FOREIGN PATENT DOCUMENTS 2056019  3/1981  United Kingdom ............. 192/106.1

Primary Examiner—William E. Tapolcai
Attorney, Agent, or Firm—Peter K. Kontler

[57] ABSTRACT

The clutch plate of a friction clutch in a motor vehicle has a first damping unit whose input element carries the friction linings and whose output element is a first hub having a radially outwardly extending first flange, and a second damping unit whose input element constitutes the input element of the first damping unit and whose output element has a second hub surrounding a portion of the first hub and having a second flange extending radially outwardly therefrom. The first damping unit has first coil springs in registering openings of the first flange and the input element, and the second damping unit has second coil springs in registering openings of the input element and second flange. The springs of the first unit oppose rotation of the linings relative to the first hub during a first stage of angular movement of the input element relative to the first hub, and the springs of the second unit cooperate with the springs of the first unit to yieldably oppose further rotation of the linings relative to the first hub. The extent to which the springs of the first unit alone oppose rotation of the linings relative to the first hub is determined by the circumferential play between the external teeth of the first hub and the internal teeth of the second hub.

21 Claims, 2 Drawing Figures

CLUTCH PLATE

BACKGROUND OF THE INVENTION

The present invention relates to friction clutches in general, especially to friction clutches for use in motor vehicles or the like, and more particularly to improvements in clutch plates or clutch discs which can be used in friction clutches to transmit torque between the driving and driven components of the clutch. Still more particularly, the invention relates to improvements in clutch discs or clutch plates of the type wherein a first set of coil springs or analogous energy storing elements is interposed between the input and output elements of a primary damping unit and a second set of coil springs or analogous energy storing elements is interposed between the input and output elements of a secondary damping unit.

Clutch discs of the above outlined character are disclosed, for example, in German Utility Model No. 72 05 198. The clutch disc of this German Utility Model is constructed and assembled in such a way that the primary damping unit is effective within the entire range of angular movement of the driven component of the clutch with reference to the driving component and the second damping unit is effective during a certain stage of such angular movement, namely, following a stage during which the first damping unit constitutes the sole means for yieldably opposing rotation of the driven component relative to the driving component of the friction clutch or vice versa. Each of the two damping units comprises discrete input and output elements and discrete energy storing means interposed between the respective input and output elements and yieldably opposing rotation of the output elements relative to the respective input elements. The output element of the first damping unit can be provided with an internal profile which is complementary to the external profile of a shaft, e.g., the input member of a change-speed transmission in a motor vehicle, and each output element can further comprise a hub whereby the hub of the output element of the first damping unit extends into the hub of the output element of the second damping unit and has external teeth meshing, with circumferential clearance, with internal teeth of the hub which forms part of the output element of the second damping unit. The energy storing means of the first damping unit comprises a set of coil springs which are installed in registering windows of the input and output elements of the first damping unit, and the energy storing means of the second damping unit includes coil springs installed in registering windows of the input and output elements of the second damping unit.

A drawback of the just outlined conventional clutch plate is that it comprises a substantial number of parts and that its axial length is substantial; this contributes to the bulk and cost of the friction clutch wherein such clutch plate is put to use.

OBJECTS AND SUMMARY OF THE INVENTION

An object of the invention is to provide a novel and improved clutch plate which comprises a surprisingly small number of component parts.

Another object of the invention is to provide a clutch plate wherein several parts can perform plural functions such as must be performed by discrete parts of heretofore known clutch plates.

A further object of the invention is to provide a clutch plate whose axial length is a fraction of the axial length of conventional clutch plates.

An additional object of the invention is to provide a clutch plate which can be assembled within a fraction of the time that is required for assembly of conventional clutch plates.

Another object of the invention is to provide a clutch plate whose initial cost is a small fraction of the cost of conventional clutch plates.

Still another object of the invention is to provide a clutch plate which can be used in existing friction clutches as a superior substitute for heretofore known clutch plates.

An additional object of the invention is to provide a novel and improved method of transmitting torque between the two damping units of a clutch plate.

An ancillary object of the invention is to provide a clutch plate which comprises fewer component parts than the heretofore known clutch plates.

Another object of the invention is to provide a friction clutch which embodies a clutch plate of the above outlined character.

An additional object of the invention is to provide a motor vehicle including a friction clutch which embodies the above outlined clutch plate.

The invention is embodied in a clutch plate, particularly for use in the friction clutches of motor vehicles. The clutch plate comprises a primary damping unit which includes a rotary input element, a first rotary output element which is coaxial with and is rotatable with reference to the input element, and first energy storing means interposed between the input element and the first output element and serving to yieldably oppose rotation of the first output element with reference to the input element in a given (clockwise or counterclockwise) direction. The clutch plate further comprises a second damping unit including the aforementioned input element, a second rotary output element which is coaxial with the input element and is rotatable relative thereto, and second energy storing means interposed between the input element and the second output element and serving to yieldably oppose rotation of the second output element with reference to the input element in the aforementioned (given) direction. Each of the two output elements comprises a flange, and the input element preferably constitutes a disc which is interposed between the two flanges.

The first output element is rotatable with reference to the input element through a first angle, and the first energy storing means is designed to oppose such rotary movement of the first output element through the entire first angle. The second energy storing means is preferably designed to oppose rotation of the second output element relative to the input element through a smaller second angle subsequent to rotation of the first output element through a third angle which equals or approximates the difference between the first and second angles. At least one of the energy storing means can comprise at least one coil spring and/or at least one friction generating device.

Each output element further comprises a hub, and one of the hubs has external teeth meshing with circumferential clearance with internal teeth of the other hub. The external teeth can be provided on the hub of the first output element, and the hub of the second output element preferably surrounds only a portion of the hub which forms part of or constitutes the first output element.

The flanges are rigid with the respective hubs (for example, the flanges can form integral parts of the respective hubs). The input element and the flange of the first output element are preferably formed with registering first windows or other forms of openings for the first energy storing means (e.g., in the form of coil springs), and the input element and the flange of the second output element preferably have second windows or analogous openings for the second energy storing means in the form of coil springs or the like.

The internal profile of the hub which forms part of or constitutes the first output element is preferably complementary to the external profile of a shaft which can receive torque from the hub of the first output element; such shaft can constitute the input element of a change-speed transmission in the motor vehicle.

At least one friction lining is secured (directly or indirectly) to and is rotatable with the input element. The clutch plate can comprise a second disc-shaped element which resembles the output element and is coaxial therewith. The friction lining or linings can be rigidly connected to the second disc-shaped element and the clutch plate can further comprise rivets, bolts or other suitable means for securing the second disc-shaped element to the input element. Friction generating means can be interposed between the input element and the flange of the second output element, and such friction generating means can be stressed in the axial direction of the input and output elements. The friction generating means can comprise an annular spring having a first portion reacting against the flange of the second output element and a second portion bearing against the input element. One of these portions of the friction generating means is disposed radially outwardly of the other portion, and the flange of the second output element can be provided with an axially extending protuberance which abuts against the first portion of the friction generating means. Such friction generating means serves to bias the input element against or toward the flange of the first output element.

The clutch plate preferably further comprises an annular washer-like member which is coaxial with the input element and is secured thereto by rivets, bolts or the like. The flange of the first output element is then disposed between the washer-like member and the input element. Friction generating means can be interposed between the washer-like member and the flange of the first output element, and such friction generating means can be biased against the flange of the first output element by a spring through the medium of a washer or the like. Additional friction generating means can be interposed between the input element and the flange of the first output element.

The input element (which preferably constitutes a disc) preferably extends radially inwardly beyond the outermost portion of the hub of the first output element.

As considered in the axial direction of the improved clutch plate, its constituents are preferably disposed in the following order: The second disc-shaped element which carries the friction lining or linings is adjacent to the flange of the hub which forms part of the second output element, and a friction ring is interposed between such second disc-shaped element and the flange of such hub. The hub of the first output element extends into the hub of the second output element and its flange is separated from the flange of the other hub by the disc-shaped input element which is connected to the first disc-shaped element by rivets or the like. An axially acting annular spring is disposed between the two flanges, namely, between the flange of the hub of the second output element and the input element. A friction generating device is interposed between the aforementioned washer-like member and the input element, and such friction generating device is adjacent to a spring which reacts against a washer and urges the friction generating device against the flange of the hub which forms part of the first output element. The coil springs which constitute or form part of the first energy storing means are installed in registering windows which are provided in the input element, in the washer-like member and in the flange of the first output element, and the coil springs which constitute the second energy storing means are disposed in registering windows provided in the input element, in the second disc-shaped element and in the flange of the second output element.

The novel features which are considered as characteristic of the invention are set forth in particular in the appended claims. The improved clutch plate itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
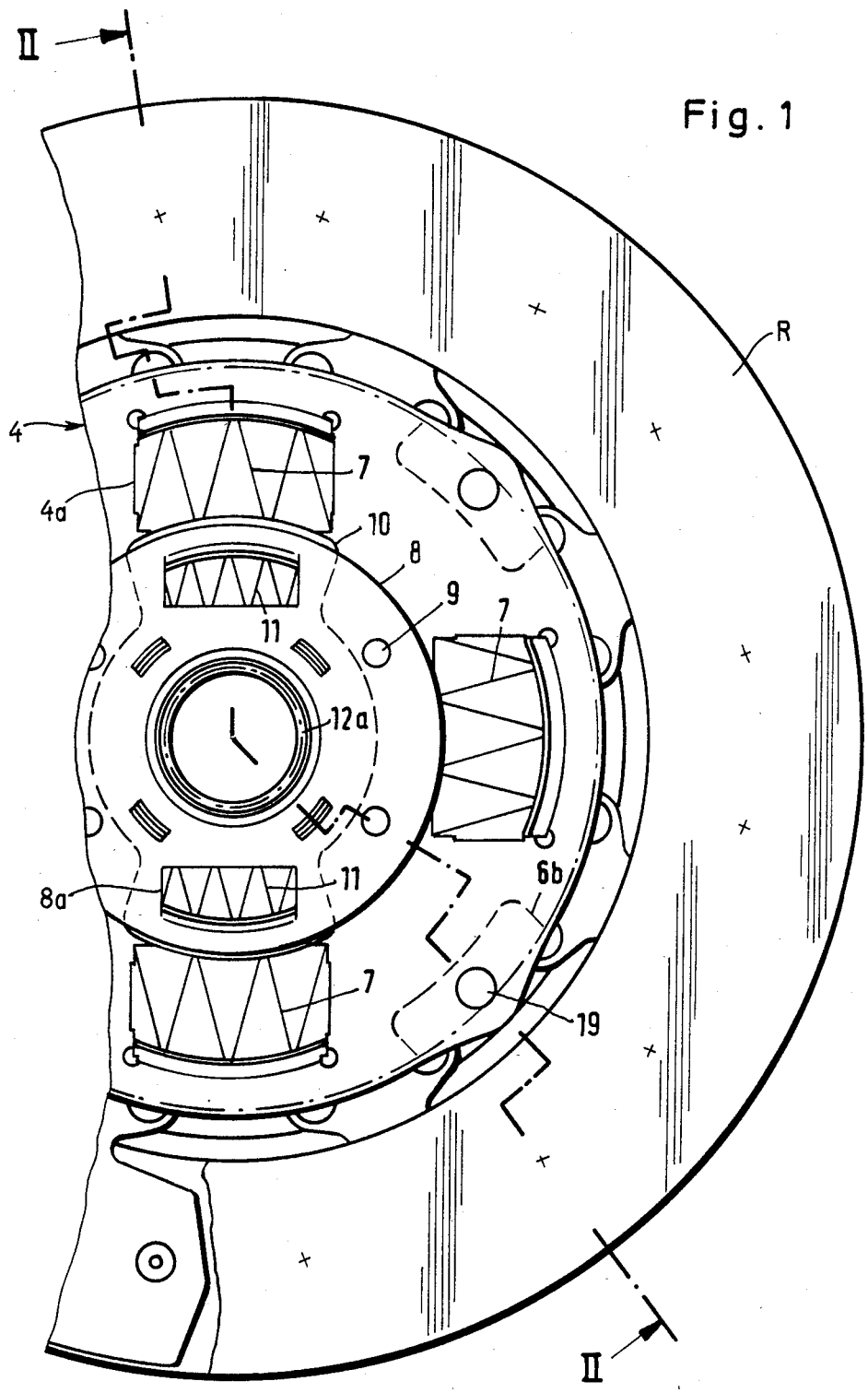
FIG. 1 is a fragmentary front elevational view of a clutch plate which embodies one form of the invention.
Figure 2:
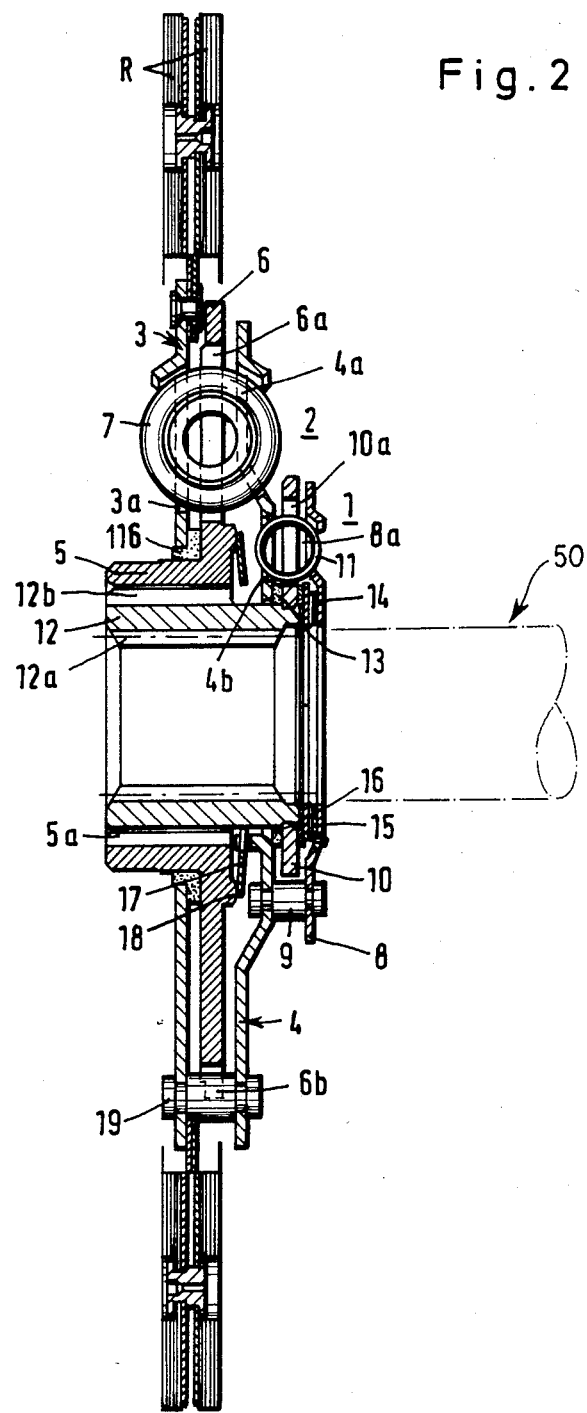
FIG. 2 is a composite sectional view substantially as seen in the direction of arrows from the line II—II of FIG. 1.

The clutch disc or clutch plate which is illustrated in FIGS. 1 and 2 comprises a first or primary damping unit 1 and a second or secondary (main) damping unit 2. The secondary damping unit 2 receives torque from the flywheel (not shown) on the crankshaft of an internal combustion engine, and the secondary damping unit transmits torque to the externally splined or similarly profiled input shaft 50 of a change-speed transmission in the motor vehicle. The input element of the secondary damping unit 2 comprises a first disc-shaped element 4 which is coaxial with a second disc-shaped element 3 and is connected thereto by an annulus of fasteners in the form of rivets 19 or the like. The second disc-shaped element 3 carries two friction linings R one of which can be engaged by the aforementioned flywheel and the other of which can be engaged by the pressure plate of the friction clutch when the latter is operative so that the flywheel can rotate the input element 4 through the medium of the linings R, element 3 and rivets 19. The output element of the secondary damping unit 2 comprises a hub 5 which is coaxial with the input element 4 and has a radially outwardly extending flange 6 (such flange can form an integral part of or it may be rigidly secured to the hub 5) rotatable within limits relative to the input element 4 and disc-shaped member 3. The means for yieldably opposing rotation of the hub 5 relative to the input element 4 in a given direction (or vice versa) comprises a set of preferably equidistant energy storing coil springs 7 each of which is installed in registering window-like openings 4a, 3a, 6a of the input element 4, second disc-shaped element 3 and flange 6.

In accordance with a feature of the invention, the input element 3 of the secondary damping unit 2 constitutes the input element of the primary or first damping unit 1 whose output element comprises a hub 12 having a radially outwardly extending flange 10 (the flange 10 can constitute an integral part of the hub 12 or it may be rigidly secured thereto). The primary damping unit 1 further comprises a set of equidistant energy storing elements in the form of coil springs 11 which are installed in registering window-like openings 4a, 10a and 8a respectively provided in the input element 4, in the flange 10 and in a washer-like member 8 which is coaxial with the input element 4 and is rigidly secured thereto by an annulus of equidistant rivets 9 or analogous fastener means. The input element 4 is installed in the space between the flanges 6 and 10, and the flange 10 is installed in the space between the input element 4 and the washer-like member 8. The coil springs 11 yieldably oppose rotation of the hub 12 with reference to the input element 4 through a predetermined angle, the coil springs 7 yieldably oppose rotation of the hub 5 relative to the input element 4 (together with the coil springs 11) through a second stage of rotation of the hub 12 through the predetermined angle, and the coil springs 11 alone oppose rotation of the hub 12 relative to the linings R through a first stage of rotation of the hub 12 relative to the input element 4 through the predetermined angle. The arrangement is such that, when the friction linings R begin to rotate because they are clamped between the aforementioned flywheel and the associated pressure plate, the coil springs 11 are caused to store energy during a first stage of rotation of the linings R, the coil springs 11 and 7 jointly store energy during the next-following second stage of rotation of the linings R, and the linings R thereupon rotate with the hub 12 (while the springs 11 and 7 store energy) during any further stage of rotation of the linings.

The fluted or similarly configurated internal profile 12a of the hub 12 is complementary to the external profile of the input shaft 50 of the aforementioned change-speed transmission, and the periphery of the hub 12 is provided with external teeth 12b meshing, with circumferential clearance, with the internal teeth 5a of the hub 5. The axial length of the hub 12 exceeds the axial length of the hub 5, i.e., only a portion of the hub 12 extends into the interior of the hub 5. The circumferential play between the internal teeth 5a and the external teeth 12b equals the aforementioned first angle.

As mentioned above, the coil springs 11 yieldably oppose rotation of the hubs 5 and 12 relative to each other through the sum of the first and second angles, and such rotation of the hubs 5 and 12 relative to each other is further opposed by a friction generating device including friction discs or rings 13, 14 which are disposed at the opposite sides of the flange 10, as well as by an undulate annular spring 15 which is interposed between the friction disc or ring 14 and a washer 16. The friction disc 14 bears against the washer-like member 8, the washer 16 is adjacent to the flange 10, and the spring 15 is interposed between the parts 14, 16.

When the teeth 5a of the hub 5 come into mesh with the teeth 12b of the hub 12, the primary damping unit 1 remains operative but is then assisted by the secondary damping unit 2. The damping action of the unit 2 is assisted by a second friction generating device including a friction disc or ring 116, which is interposed between the flange 6, and a dished spring 17 which is active in the axial direction of the clutch plate. The ring 116 is installed between the second disc-shaped element 3 and the flange 6, and the dished spring 17 is installed between an axially extending annular protuberance 18 of the hub 5 and an axially extending radially innermost portion of the input element 4. Thus, the radially outermost portion of the spring 17 reacts against the protuberance 18, the radially innermost portion of the spring 17 bears against the input element 4 to urge the latter axially in a direction toward the flange 10.

The maximum extent of angular displacement between the friction linings R and the hub 12 is determined by the shanks of the rivets 19 which extend into cutouts 6b provided in the periphery of the flange 6. The length of such cutouts, and as considered in the circumferential direction of the hubs 5 and 12, equals the sum of the aforementioned first and second angles.

An important advantage of the improved clutch plate is that the input element (4) of the first or primary damping unit 1 simultaneously constitutes the input element of the second or secondary damping unit 2. This contributes to simplicity, compactness and convenience of assembly of the clutch plate. Thus, the number of parts of the clutch plate is reduced and the number of parts which must be assembled is less than in conventional clutch plates. For example, the improved clutch plate can dispense with a split ring which is used in the clutch plate of the aforementioned German Utility Model to secure the hubs of the primary and secondary damping units to one another in predetermined axial positions. Such split ring can be omitted together with the discrete input element for one of the two damping units in the clutch plate of the Utility Model. Omission of the split ring further entails elimination of undesirable friction which is generated by such split ring.

It will be noted that the radially innermost portion of the input element 4 is located radially inwardly of the radially outermost portion (teeth 12b) of the hub 12. The parts 14, 15 and 16 are coaxial with and are adjacent to the right-hand end face of the hub 12, as viewed in FIG. 2 of the drawing. The parts 13, 17 surround the hub 12, and the part 116 surrounds the hub 5.

The parts 14, 15 and 16 are optional; however, they are desirable and advantageous because they complete the friction generating means of the primary damping unit 1.

The assembly of component parts in the order shown in FIG. 2 (as considered in the axial direction of the clutch plate) exhibits the advantage that the overall axial length of the clutch plate is reduced to a fraction of that of conventional clutch plates. Thus, the parts 3 and 16 surround the hub 5, the part 116 is disposed between the second disc-shaped element 3 and the flange 6, the spring 17 is disposed between the disc-shaped elements 3, 4, the input element 4 is disposed between the flanges 6, 10 (actually between the spring 17 and the flange 10), a portion of the hub 12 extends into the hub 5, the part 13 is disposed between the input element 4 and the flange 10, and the parts 14, 15, 16 are disposed between the flange 10 and the washer-like member 8.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A clutch plate, particularly for use in the friction clutches of motor vehicles, comprising a primary damping unit including a substantially disc-shaped rotary input element, a first rotary output element coaxial with and rotatable relative to said input element through a predetermined angle, and first energy storing means interposed between said elements and arranged to yieldably oppose rotation of said output element with reference to said input element in a given direction through the entire predetermined angle; and a second damping unit including said input element, a second rotary output element coaxial with and rotatable relative to said input element, and second energy storing means interposed between said input element and said second output element and arranged to yieldably oppose rotation of said second output element with reference to said input element in said given direction through a second stage of rotation of said first output element relative to said input element through said predetermined angle subsequent to rotation of said first output element relative to said input element through a first stage of rotation through said predetermined angle against the opposition of said first energy storing means, at least one of said energy storing means comprising at least one spring, each of said output elements comprising a flange and said input element being disposed between said flanges, each of said output elements further comprising a hub and the hub of said first output element having external teeth and the hub of said second ouput element having internal teeth meshing with circumferential play with said internal teeth, the hub of said second output element surrounding the hub of said first output element and said flanges being rigid with the respective hubs, said input element and the flange of said first output element having first registering openings for said first energy storing means and said input element and the flange of said second output element having second registering openings for said second energy storing means.

2. The clutch plate of claim 1, wherein at least one of said energy storing means comprises at least one friction generating device.

3. The clutch plate of claim 1, wherein the hub of said first output element has an internal profile complementary to the external profile of a shaft which can receive torque from said hub.

4. The clutch plate of claim 1, further comprising at least one friction lining secured to and rotatable with said input element.

5. The clutch plate of claim 4, wherein further comprising a second disc-shaped element coaxial with said disc-shaped input element and connected to said friction lining, and means for non-rotatably securing said disc-shaped elements to one another.

6. The clutch plate of claim 1, further comprising resilient friction generating means interposed between said input element and the flange of said second output element, said friction generating means being stressed in the axial direction of said elements.

7. The clutch plate of claim 1, further comprising friction generating means interposed between said input element and the flange of said first output element.

8. The clutch plate of claim 1, wherein said input element extends radially inwardly beyond the radially outermost portion of the hub of said first output element.

9. A clutch plate, particularly for use in the friction clutches of motor vehicles, comprising a first annular disc; friction lining means affixed to said disc; a first hub coaxial with said disc and having a first flange adjacent to one side of said disc; a friction generating element interposed between said disc and said flange; a second hub coaxial with and extending into said first hub, said second hub having a fluted internal profile and an annulus of external teeth and said first hub further having an annulus of internal teeth mating with circumferential clearance with said external teeth, said second hub further having a second flange and said first flange being disposed between said disc and said second flange; an axially acting spring interposed between said flanges; a second disc interposed between said spring and said second flange; means for non-rotatably securing said discs to each other, said discs and said first flange having registering first openings; first helical coil springs provided in said openings and arranged to yieldably oppose rotation of said first flange relative to said discs in a given direction; a friction generating device interposed between said second flange and said second disc; a washer coaxial with said discs; means for securing said washer to said second disc, said second flange being disposed between said washer and said second disc; a spring interposed between said washer and said second flange, said second flange, said washer and said second disc having registering second openings; and second coil springs installed in said second openings and arranged to yieldably oppose rotation of said second flange with reference to said second disc in said given direction.

10. A clutch plate, particularly for use in the friction clutches of motor vehicles, comprising a primary damping unit including a rotary input element, a first rotary output element coaxial with and rotatable relative to said input element, and first energy storing means interposed between said elements and arranged to yieldably oppose rotation of said output element with reference to said input element in a given direction; a secondary damping unit including said input element, a second rotary output element coaxial with and rotatable relative to said input element, and second energy storing means interposed between said input element and said second output element and arranged to yieldably oppose rotation of said second output element with reference to said input element in said given direction, each of said output elements comprising a flange and said input element being disposed between said flanges; and resilient friction generating means interposed between said input element and the flange of said second output element, said friction generating means being stressed in the axial direction of said elements and comprising an annular spring having a first portion reacting against the flange of said second output element and a second portion bearing against said input element, one of said portions being disposed radially outwardly of the other of said portions.

11. The clutch plate of claim 10, wherein the flange of said second output element has an axially extending protuberance abutting against the first portion of said spring.

12. A clutch plate, particularly for use in the friction clutches of motor vehicles, comprising a primary damping unit including a rotary input element, a first rotary output element coaxial with and rotatable relative to said input element, and first energy storing means interposed between said elements and arranged to yieldably oppose rotation of said output element with reference to said input element in a given direction; a secondary damping unit including said input element, a second rotary output element coaxial with and rotatable relative to said input element, and second energy storing means interposed between said input element and said second output element and arranged to yieldably oppose rotation of said second output element with reference to said input element in said given direction, each of said output elements comprising a flange and said input element being disposed between said flanges; and resilient friction generating means interposed between said input element and the flange of said second output element, said friction generating means being stressed in the axial direction of said elements, reacting against the flange of said second output element and being arranged to bias said input element axially toward the flange of said first output element.

13. A clutch plate, particularly for use in the friction clutches of motor vehicles, comprising a primary damping unit including a rotary input element, a first rotary output element coaxial with and rotatable relative to said input element, and first energy storing means interposed between said elements and arranged to yieldably oppose rotation of said output element with reference to said input element in a given direction; a secondary damping unit including said input element, a second rotary output element coaxial with and rotatable relative to said input element, and second energy storing means interposed between said input element and said second output element and arranged to yieldably oppose rotation of said second output element with reference to said input element in said given direction, each of said output elements comprising a flange and said input element being disposed between said flanges; an annular washer-like member coaxial with said input element; and means for securing said member to said input element, the flange of said first output element being disposed between said member and said input element.

14. The clutch plate of claim 13, wherein at least one of said energy storing means includes at least one spring.

15. The clutch plate of claim 13, wherein each of said output elements further comprises a hub, one of said hubs having external teeth and the other of said hubs having internal teeth meshing with circumferential play with said external teeth.

16. The clutch plate of claim 15, wherein said external teeth are provided on the hub of said first output element.

17. The clutch plate of claim 16, wherein the hub of said second output element surrounds only a portion of the hub of said first output element.

18. The clutch plate of claim 15, wherein said flanges are rigid with the respective hubs, said input element and the flange of said first output element having first registering openings for said first energy storing means and said input element and the flange of said second output element having second registering openings for said second energy storing means.

19. The clutch plate of claim 13, wherein said input element includes a disc.

20. The clutch plate of claim 13, further comprising friction generating means interposed between said member and the flange of said first output element.

21. The clutch plate of claim 20, further comprising a washer adjacent to said friction generating means and axially stressed resilient means between said washer and said friction generating means.

* * * * *